(12) United States Patent
Guo et al.

(10) Patent No.: US 11,617,459 B2
(45) Date of Patent: Apr. 4, 2023

(54) BEVERAGE BREWING DEVICE

(71) Applicant: GUANGDONG XINBAO ELECTRICAL APPLIANCES HOLDINGS CO., LTD, Guangdong (CN)

(72) Inventors: Jiangang Guo, Guangdong (CN); Peng Ji, Guangdong (CN)

(73) Assignee: GUANGDONG XINBAO ELECTRICAL APPLIANCES HOLDINGS CO., LTD.

( * ) Notice: Subject to any disclaimer, the term of this patent is extended or adjusted under 35 U.S.C. 154(b) by 441 days.

(21) Appl. No.: 16/754,371

(22) PCT Filed: Aug. 3, 2018

(86) PCT No.: PCT/CN2018/098445
§ 371 (c)(1),
(2) Date: Apr. 8, 2020

(87) PCT Pub. No.: WO2019/072002
PCT Pub. Date: Apr. 18, 2019

(65) Prior Publication Data
US 2020/0237124 A1 Jul. 30, 2020

(30) Foreign Application Priority Data
Oct. 12, 2017 (CN) .......................... 201721313187.6

(51) Int. Cl.
*A47G 19/14* (2006.01)
*A47J 31/52* (2006.01)
(Continued)

(52) U.S. Cl.
CPC ................. *A47G 19/14* (2013.01); *A23F 3/18* (2013.01); *A47G 19/127* (2013.01); *A47G 19/16* (2013.01);
(Continued)

(58) Field of Classification Search
CPC ......... A23F 3/18; A47G 19/127; A47G 19/14; A47G 19/16; A47J 27/21166;
(Continued)

(56) References Cited

U.S. PATENT DOCUMENTS

2011/0041701 A1* 2/2011 Chatterjee ........... A47J 31/3642
99/295

FOREIGN PATENT DOCUMENTS

| CN | 103735156 A | 4/2014 |
| CN | 107997588 | * 5/2018 |

* cited by examiner

Primary Examiner — Dana Ross
Assistant Examiner — Joseph W Iskra

(57) ABSTRACT

The present disclosure relates to the technical field of tea brewing devices, and more particularly, to a beverage brewing device. The beverage brewing device comprises a kettle body, a heating disc, and a tea-leaf basket. The heating disc and the tea-leaf basket are located in the kettle body and an air cylinder mechanism is fixed in the kettle body. A moving piston is arranged in an inner cavity of the air cylinder mechanism, and the piston is connected to the tea-leaf basket. The air cylinder mechanism is connected to an air pump, which is used for conveying a driving gas to the air cylinder mechanism. The piston is driven by the driving gas, thereby driving the tea-leaf basket to move in the kettle body. The air cylinder mechanism may automatically drive the tea-leaf basket to move up and down, achieving a simple structure and a low cost.

10 Claims, 3 Drawing Sheets

(51) Int. Cl.
  *A23F 3/18* (2006.01)
  *A47G 19/12* (2006.01)
  *A47G 19/16* (2006.01)
  *A47J 31/20* (2006.01)
  *A47J 31/54* (2006.01)
(52) U.S. Cl.
  CPC ........... *A47J 31/20* (2013.01); *A47J 31/5253* (2018.08); *A47J 31/54* (2013.01)
(58) Field of Classification Search
  CPC .... A47J 31/0615; A47J 31/20; A47J 31/5253; A47J 31/54; A47J 27/21; A47J 31/06; A47J 36/06
  USPC .......................................................... 99/281
  See application file for complete search history.

BEVERAGE BREWING DEVICE

TECHNICAL FIELD

The present disclosure relates to the technical field of tea brewing devices, and more particularly, to a beverage brewing device.

BACKGROUND

When using a kettle or an electric kettle to brew tea, a tea-leaf basket is arranged in the kettle body for facilitating the collection and cleaning of tea-leaves. In the prior art, the tea-leaf basket can only be arranged at the opening of the kettle body, and its position is relatively fixed, making it unable to move up and down. When brewing tea by using a kettle, the soaking time of some tea-leaves must be controlled, or when the water level in the kettle drops, the tea-leaves need to be kept soaking in the water so that the tea fragrance can be held. When tea-leaves are added, the tea-leaf basket is preferably lifted to the top, thus preventing tea-leaves from falling out of the tea-leaf basket. However, for the tea-leaf basket cannot be lifted or lowered, the aforesaid functions cannot be achieved, resulting in an inconvenient use. To solve the technical problem of this issue, the Chinese patent CN103735156A discloses a kettle capable of automatically controlling the lifting and lowering of the tea-leaf basket, which comprises a kettle cover, a kettle body, a kettle bottom, a handle, a control panel, a tea-leaf basket and a lifting mechanism for lifting or lowering the tea-leaf basket, wherein the lifting mechanism comprises a connecting assembly, a driving assembly, and a control assembly. The connecting assembly comprises a hollow screw rod, a supporting shaft, and a screw sleeve. The hollow screw rod is vertically arranged in the kettle body, wherein one end of the screw sleeve is fixedly connected to the tea-leaf basket, and the other end of the screw sleeve is sleeved on the periphery of the hollow screw rod. The hollow screw rod is in threaded engagement with the screw sleeve, and the supporting shaft is arranged in the hollow screw rod in a penetrating mode. The reduction gearbox of the driving assembly is connected to the motor, and the output shaft of the reduction gearbox is connected to the hollow screw rod to drive the hollow screw rod to rotate. Alternatively, the output shaft of the reduction gearbox is connected to the hollow screw rod through a transmission member, thereby driving the hollow screw rod to rotate. The control assembly comprises a control circuit/control program and control buttons. According to the technical solution of the aforesaid patent, the motor and the speed reducer drive the screw rod to rotate, enabling the screw rod and the screw sleeve to form a threaded transmission. In this way, the tea-leaf basket connected to the screw sleeve can be driven to move up and down in the kettle body. Although the aforesaid technical solution achieves an automatic lifting/lowering of the tea-leaf basket, the structure of the transmission mechanism is complex, the production and maintenance costs are high, and the later maintenance is troublesome.

SUMMARY OF THE DISCLOSURE

The present disclosure provides a beverage brewing device, which can automatically drive the tea-leaf basket to move up and down. The beverage brewing device described has a simple structure and is cost-effective.

To achieve the above purpose, the present disclosure adopts the following technical solution:

A beverage brewing device of the present disclosure comprising a kettle body, a heating disc, and a tea-leaf basket, wherein the heating disc and the tea-leaf basket are located in the kettle body; an air cylinder mechanism is fixed in the kettle body, a moving piston is arranged in the inner cavity of the air cylinder mechanism, and the piston is connected to the tea-leaf basket; the air cylinder mechanism is connected to an air pump, and the air pump is used for conveying a driving gas to the air cylinder mechanism; the piston is driven by the driving gas, thereby driving the tea-leaf basket to move in the kettle body; the beverage brewing device of the present disclosure adopts an air cylinder mechanism to automatically drive the tea-leaf basket to move up and down, achieving a simple structure and a low cost.

In another aspect of the present disclosure, the output end of the air pump is connected to an electronic pressure relief valve, and the output end of the electronic pressure relief valve is connected to a first air pipe and a second air pipe in parallel, wherein the first air pipe and the second air pipe are respectively connected to the first end and the second end of the air cylinder mechanism. The electronic pressure relief valve is connected to the two ends of the air cylinder mechanism, and the piston can be automatically driven by air pressure to move between the two ends of the air cylinder, thereby achieving the lifting and lowering of the tea-leaf basket. The structure is simple and cost-effective.

In another aspect of the present disclosure, the output end of the air pump is connected to a pressure relief valve, and the output end of the pressure relief valve is connected to the first end of the air cylinder mechanism through the first air pipe. The second end of the air cylinder mechanism is provided with an exhaust port, and the piston is connected to a return spring. The piston is driven by the air cylinder mechanism to propel the tea-leaf basket to move, and is driven by the return spring to propel the tea-leaf basket to reset. Thus, the tea-leaf basket can be lifted and lowered, achieving a simple structure and a low cost.

In another aspect of the present disclosure, the output end of the air pump is connected to the lower end of the air cylinder mechanism through a first air pipe, the piston is telescopically moved via the upper end of the air cylinder mechanism, and a pressure relief valve is connected to the first air pipe in parallel. The air cylinder drives the piston to propel the tea-leaf basket to move upward, and the self-weight of the piston and the tea-leaf basket enables the tea-leaf basket to move downward and reset. Thus, the tea-leaf basket can be lifted and lowered, achieving a simple structure and a low cost.

In another aspect of the present disclosure, the kettle body is provided with a handle, and the first air pipe is located in the inner cavity of the handle. Through adopting this arrangement, the air path becomes reasonable and simple.

In another aspect of the present disclosure, the piston comprises a multi-stage telescopic piston, and the lifting of the tea-leaf basket is achieved through the multi-stage telescopic piston. The tea-leaf basket can be driven to move upward by small air pressure, making the lifting of the tea-leaf basket more flexible and rapid.

In another aspect of the present disclosure, the air pump is located at the bottom end of the kettle body and is located underneath the heating disc, making the structural arrangement in the kettle body more reasonable. Meanwhile, the air pump is separated from the heating disc, thus being prevented from contacting with the water in the kettle body.

In another aspect of the present disclosure, the kettle body is provided with an operation panel, wherein the operation panel is provided with a tea-leaf key used for controlling the air pump, and a temperature selection key used for controlling the heating disc to heat at different temperatures. According to this design, the tea-brewing can be automized, achieving a simple and convenient operation.

According to the beverage brewing device of the present disclosure, the air cylinder mechanism and the air pump interact to drive the tea-leaf basket to move in the kettle body. Thus, the soaking time of tea-leaves in the tea-leaf basket can be controlled by the user, and tea-leaves can be conveniently replaced or added into the tea-leaf basket. The structure driven by the air cylinder is simple and cost-effective.

Figure 1:
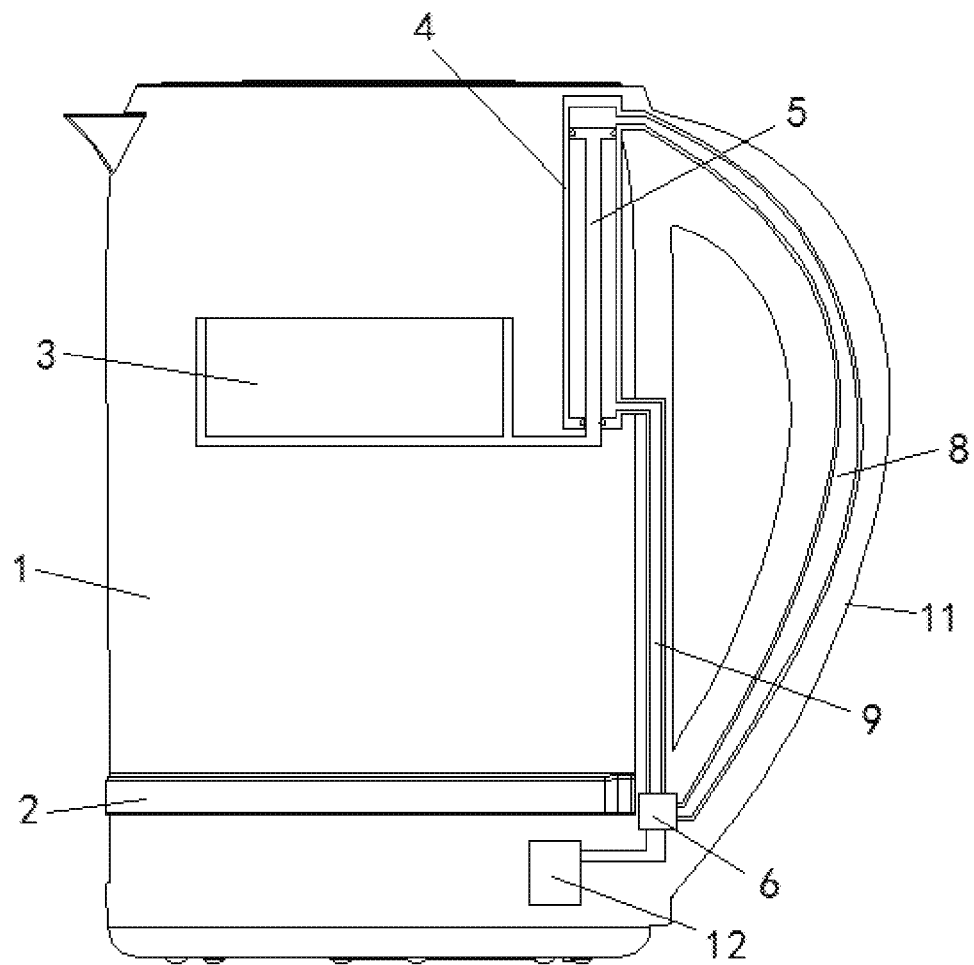
FIG. 1 is a structural diagram of a first embodiment of the present disclosure.

In Figures: 1—Kettle Body, 2—Heating Disc, 3—Tea-leaf Basket, 4—Air Cylinder Mechanism, 5—Piston, 6—Electronic Pressure Relief Valve, 7—Pressure Relief Valve, 8—The First Air Pipe, 9—The Second Air Pipe, 10—Return Spring, 11—Handle, 12—Air Pump, 13—Exhaust Port.

DETAILED DESCRIPTION OF THE DISCLOSURE

Drawings and detailed embodiments are combined hereinafter to elaborate the technical solutions of the present disclosure.

The beverage brewing device of the present disclosure comprises a kettle body 1, a heating disc 2, and a tea-leaf basket 3, wherein the heating disc 2 and the tea-leaf basket 3 are located in the kettle body 1. An air cylinder mechanism 4 is fixed in the kettle body 1, a moving piston 5 is arranged in the inner cavity of the air cylinder mechanism 4, and the piston 5 is connected to the tea-leaf basket 3. The air cylinder mechanism 4 is connected to an air pump 12, and the air pump 12 is used for conveying a driving gas to the air cylinder mechanism 4. The piston 5 is driven by the driving gas, thereby driving the tea-leaf basket 3 to move in the kettle body 1. The beverage brewing device of the present disclosure can automatically drive the tea-leaf basket 3 to move up and down, has a simple structure and is cost-effective.

In the first embodiment of the present disclosure, as shown in FIG. 1, the output end of the air pump 12 is connected to an electronic pressure relief valve 6, and the output end of the electronic pressure relief valve 6 is connected to a first air pipe 8 and a second air pipe 9 in parallel, wherein the first air pipe 8 and the second air pipe 9 are respectively connected to the first end and the second end of the air cylinder mechanism 4. When tea-leaves need to be replaced or added into the tea-leaf basket 3, the tea-leaf basket 3 needs to be lifted to the upper end of the kettle body 1. At this point, the air pump 12 is initiated to convey a driving gas, the electronic pressure relief valve 6 allows the second end of the air cylinder mechanism 4 to be communicated with the output end of the air pump 12, and allows the first end of the air cylinder mechanism 4 to be communicated with the pressure relief end of the electronic pressure relief valve 6. In this way, the driving gas enters the second end of the air cylinder mechanism 4 from the second air pipe 9, and the gas at the first end of the air cylinder mechanism 4 is discharged from the pressure relief end, enabling the piston 5 to move upward in the air cylinder mechanism 4. Thus, the tea-leaf basket 3 is driven by the piston 5 to move upward, allowing tea-leaves to be replaced or added into the tea-leaf basket 3 by a user. When tea-leaves need to be soaked, the tea-leaf basket 3 is required to be lowered into the interior of the kettle body 1. At this point, the air pump 12 is initiated to convey the driving gas, the electronic pressure relief valve 6 allows the first end of the air cylinder mechanism 4 to be communicated with the output end of the air pump 12, and allows the second end of the air cylinder mechanism 4 to be communicated with the pressure relief end of the electronic pressure relief valve 6. In this way, the driving gas enters the first end of the air cylinder mechanism 4 from the first air pipe 8, and the gas at the second end of the air cylinder mechanism 4 is discharged from the pressure relief end, thereby enabling the piston 5 to move downward in the air cylinder mechanism 4. Thus, the tea-leaf basket 3 is driven by the piston 5 to move downward, making the tea-leaf basket 3 stay in the kettle body 1 so that the tea-leaves are soaked in water inside the kettle body 1.

Figure 2:
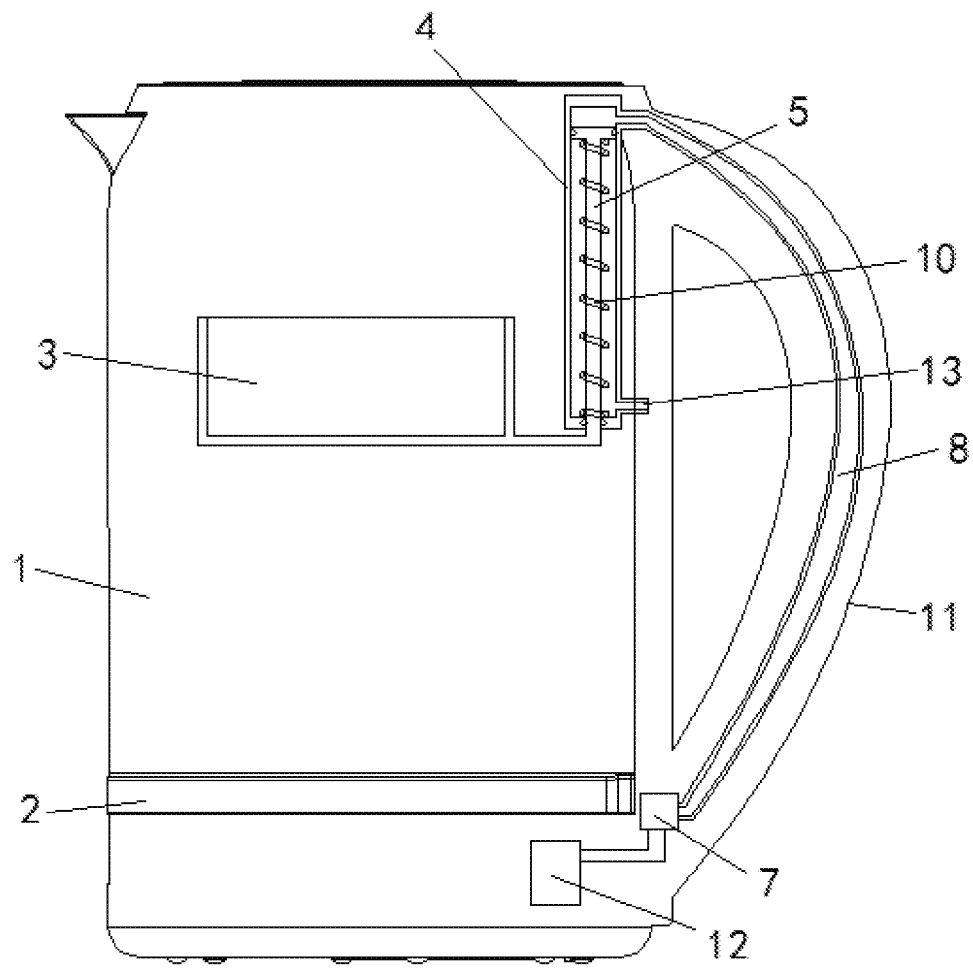
FIG. 2 is a structural diagram of a second embodiment of the present disclosure.

In the second embodiment of the present disclosure, as shown in FIG. 2, the output end of the air pump 12 is connected to a pressure relief valve 7, and the output end of the pressure relief valve 7 is connected to the first end of the air cylinder mechanism 4 through the first air pipe 8. The second end of the air cylinder mechanism 4 is provided with an exhaust port, and the piston 5 is connected to a return spring 10. When tea-leaves need to be replaced or added to the tea-leaf basket 3, the tea-leaf basket 3 is required to be lifted to the upper end of the kettle body 1. At this point, the air pump 12 does not operate and the pressure relief valve 7 is turned on. In this way, the piston 5 moves upward under the action of the return spring 10. Meanwhile, the gas at the first end of the air cylinder mechanism 4 is discharged from the first air pipe 8 and the pressure relief valve 7, while the exhaust port 13 connected to the second end of the air cylinder mechanism 4 receives a gas, thereby balancing the air pressure at the two ends of the piston 5. In this way, the air pressure resistance of the return spring 10 that drives the piston 5 to move is eliminated, and the tea-leaf basket 3 can be driven by the piston 5 to move upward, allowing tea-leaves to be replaced or added into the tea-leaf basket 3 by the user. When tea-leaves need to be soaked, the tea-leaf basket 3 is required to be lowered into the interior of the kettle body 1. At this point, the air pump 12 is initiated to convey the driving gas, and the pressure relief valve 7 allows the first end of the air cylinder mechanism 4 to be communicated with the output end of the air pump 12. Thus, the driving gas enters the first end of the air cylinder mechanism 4 from the first air pipe 8, and the gas at the second end of the air cylinder mechanism 4 is discharged from the exhaust port 13. At this point, the air pressure at the first end of the air cylinder mechanism 4 overcomes the elastic force of the return spring 10, thereby enabling the piston 5 to move downward in the air cylinder mechanism 4. Under such circumstances, the tea-leaf basket 3 moves downward when being driven by the piston 5, and the tea-leaf basket 3 stays in the kettle body 1, enabling tea-leaves to be soaked in water inside the kettle body 1.

Figure 3:
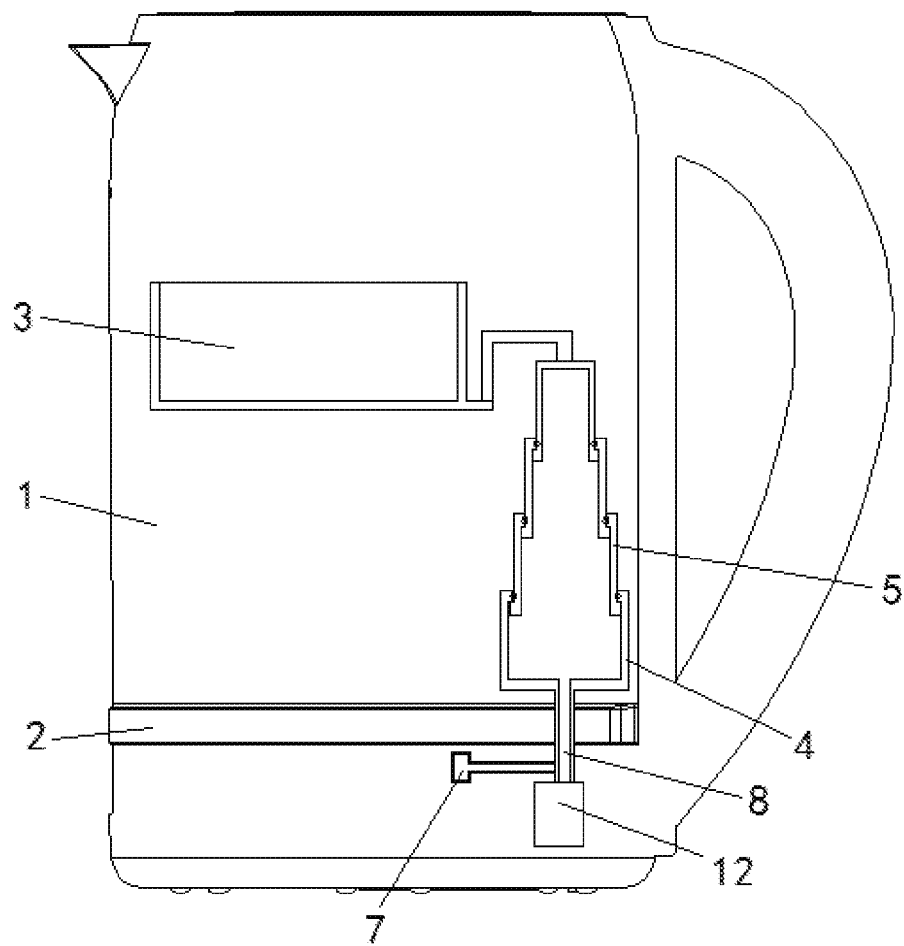
FIG. 3 is a structural diagram of a third embodiment of the present disclosure.

In the third embodiment of the present disclosure, as shown in FIG. 3, the output end of the air pump 12 is connected to the lower end of the air cylinder mechanism 4 through a first air pipe 8, the piston 5 is telescopically moved via the upper end of the air cylinder mechanism 4, and a pressure relief valve 7 is connected to the first air pipe 8 in parallel. When tea-leaves need to be replaced or added into the tea-leaf basket 3, the tea-leaf basket 3 needs to be lifted to the upper end of the kettle body 1. At this point, the air pump 12 is initiated to convey a driving gas, and the pressure relief valve 7 is turned off, allowing the lower end of the air cylinder mechanism 4 to be communicated with the output end of the air pump 12. Thus, the driving gas enters the lower end of the air cylinder mechanism 4 from the first air pipe 8, and the piston 5 moves upward under the action of the air pressure. For being propelled by the piston 5, the tea-leaf basket 3 is lifted, allowing tea-leaves to be replaced or added into the tea-leaf basket 3 by the user. When tea-leaves need to be soaked, the tea-leaf basket 3 needs to be lowered to the interior of the kettle body 1. At this point, the air pump 12 does not work and the pressure relief valve 7 is turned on. In this way, the driving gas in the air cylinder mechanism 4 is discharged from the first air pipe 8 and the pressure relief valve 7. Meanwhile, under the self-weight of the piston 5 and the tea-leaf basket 3, the piston 5 moves downward in the air cylinder mechanism 4, enabling the tea-leaf basket 3 to move downward together with the piston 5. Thus, the tea-leaf basket 3 is located in the kettle body 1, and the tea-leaves are soaked in the water in the kettle body 1.

In embodiment 1 or 2, the kettle body 1 is provided with a handle 11, and the first air pipe 8 is located in the inner cavity of the handle 11. Through adopting this arrangement, the air path becomes reasonable and simple.

In embodiment 3, the piston 5 comprises a multi-stage telescopic piston 5, and the lifting of the tea-leaf basket 3 is achieved through the multi-stage telescopic piston 5. The tea-leaf basket 3 can be driven to move upward by a small air pressure, making the lifting of the tea-leaf basket 3 more flexible and rapid.

Additionally, the air pump 12 is located at the bottom end of the kettle body 1 and is positioned underneath the heating disc, making the structural arrangement in the kettle body 1 more reasonable. Meanwhile, the air pump 12 is separated from the heating disc 2, thus being prevented from contacting with the water in the kettle body 1

Further, the kettle body 1 is provided with an operation panel, wherein the operation panel is provided with a tea-leaf key used for controlling the air pump 12, and a temperature selection key used for controlling the heating disc 2 to heat at different temperatures. According to this design, the tea-brewing can be automized, achieving a simple and convenient operation.

According to the beverage brewing device of the present disclosure, the air cylinder mechanism and the air pump interact to drive the tea-leaf basket to move in the kettle body. Thus, the soaking time of tea-leaves in the tea-leaf basket can be controlled by the user, and tea-leaves can be conveniently replaced or added into the tea-leaf basket. The structure driven by the air cylinder is simple and cost-effective.

The above are only preferred embodiments of the present disclosure. Therefore, the equivalent changes or modifications made in accordance with the structure, features and principles described in the scope of the present disclosure should fall into the scope of the present disclosure.

What is claimed is:

1. A beverage brewing device, comprising:
   a kettle body,
   a heating disc, and
   a tea-leaf basket, wherein the heating disc and the tea-leaf basket are located in the kettle body, wherein an air cylinder mechanism is fixed in the kettle body, a moving piston is arranged in an inner cavity of the air cylinder mechanism, and the piston is connected to the tea-leaf basket, wherein the air cylinder mechanism is connected to an air pump, and the air pump is used for conveying a driving gas to the air cylinder mechanism, wherein the piston is driven by the driving gas, thereby driving the tea-leaf basket to move in the kettle body;
   wherein an output end of the air pump is connected to an electronic pressure relief valve, and the output end of the electronic pressure relief valve is connected to a first air pipe and a second air pipe in parallel, wherein the first air pipe and the second air pipe are respectively connected to a first end and a second end of the air cylinder mechanism.

2. The beverage brewing device of claim 1, wherein the kettle body is provided with a handle, and the first air pipe is located in the inner cavity of the handle.

3. The beverage brewing device of claim 1, wherein the air pump is located at a bottom end of the kettle body and is located underneath the heating disc.

4. The beverage brewing device of claim 1, wherein the kettle body is provided with an operation panel, wherein the operation panel is provided with a tea-leaf key used for controlling the air pump, and a temperature selection key used for controlling the heating disc to heat at different temperatures.

5. A beverage brewing device, comprising:
   a kettle body,
   a heating disc, and
   a tea-leaf basket, wherein the heating disc and the tea-leaf basket are located in the kettle body, wherein an air cylinder mechanism is fixed in the kettle body, a moving piston is arranged in an inner cavity of the air cylinder mechanism, and the piston is connected to the tea-leaf basket, wherein the air cylinder mechanism is connected to an air pump, and the air pump is used for conveying a driving gas to the air cylinder mechanism, wherein the piston is driven by the driving gas, thereby driving the tea-leaf basket to move in the kettle body;
   wherein an output end of the air pump is connected to a pressure relief valve, and the output end of the pressure relief valve is connected to a first end of the air cylinder mechanism through a first air pipe, wherein a second end of the air cylinder mechanism is provided with an exhaust port, and the piston is connected to a return spring.

6. The beverage brewing device of claim 5, wherein the kettle body is provided with a handle, and the first air pipe is located in the inner cavity of the handle.

7. The beverage brewing device of claim 5, wherein the air pump is located at a bottom end of the kettle body and is located underneath the heating disc.

8. The beverage brewing device of claim 5, wherein the kettle body is provided with an operation panel, wherein the operation panel is provided with a tea-leaf key used for controlling the air pump, and a temperature selection key used for controlling the heating disc to heat at different temperatures.

9. A beverage brewing device, comprising:
   a kettle body,
   a heating disc, and
   a tea-leaf basket, wherein the heating disc and the tea-leaf basket are located in the kettle body, wherein an air cylinder mechanism is fixed in the kettle body, a moving piston is arranged in an inner cavity of the air cylinder mechanism, and the piston is connected to the tea-leaf basket, wherein the air cylinder mechanism is connected to an air pump, and the air pump is used for conveying a driving gas to the air cylinder mechanism, wherein the piston is driven by the driving gas, thereby driving the tea-leaf basket to move in the kettle body;

wherein an output end of the air pump is connected to a lower end of the air cylinder mechanism through a first air pipe, wherein the piston is telescopically moved via an upper end of the air cylinder mechanism, and a pressure relief valve is connected to the first air pipe in parallel.

10. The beverage brewing device of claim 9, wherein the piston comprises a multi-stage telescopic piston.

* * * * *